Dec. 19, 1922.

E. S. EVANS.
AUTOMOBILE FLOOR LOADING BUCK.
FILED MAR. 24, 1920.

1,439,663.

Inventor
E. S. Evans
By F. A. Bryant
Attorney.

Patented Dec. 19, 1922.

1,439,663

UNITED STATES PATENT OFFICE.

EDWARD S. EVANS, OF DETROIT, MICHIGAN.

AUTOMOBILE FLOOR-LOADING BUCK.

Application filed March 24, 1920. Serial No. 368,366.

*To all whom it may concern:*

Be it known that I, EDWARD S. EVANS, a citizen of the United States of America, residing at Detroit, in the county of Wayne and State of Michigan, have invented certain new and useful Improvements in Automobile Floor-Loading Bucks, of which the following is a specification.

This invention relates to certain new and useful improvements in automobile floor-loading bucks particularly adapted for holding automobiles against forward and backward thrusts relative to the floors of freight cars on which the automobiles are loaded for shipment.

The primary object of the present invention is to provide a buck of the above character which may be cheaply manufactured by reason of its simplicity of construction, and which will efficiently serve the purpose for which it is intended.

Prior devices of the present kind have been formed of a plurality of separable parts which were usually destroyed by the recipient of the shipped automobiles, and, this obviously necessitated the shipper to undergo constant expense of continuous manufacture of new bucks. A further object of the present invention is accordingly to provide a buck of the present kind constructed of substantially one piece of material and so designed as to be continually reused.

Further, prior bucks of this kind have been of quite rigid construction and, by reason thereof, the same have repeatedly caused shearing of the spring bolts and spring clips and the bending of the reach rods of the automobiles due to the unyielding nature of the bucks directly transmitting to the automobiles the strains and stresses of the freight cars in transit. A still further object of the present invention, accordingly, is to provide a buck of the present kind which is resilient or yieldable in nature so as to overcome the above mentioned disadvantages.

Briefly speaking, the present invention for carrying out the above and other objects, preferably comprises a strip of springy metal formed to provide a stirrup adapted for the reception of one end portion of a vehicle axle or a wheel hub and yieldingly suspended by downwardly diverging resilient legs.

Further objects will appear as the nature of the invention is better understood, and the same consists in the novel form, combination and arrangement of parts hereinafter more fully described, shown in the accompanying drawing and claimed.

Figure 1:
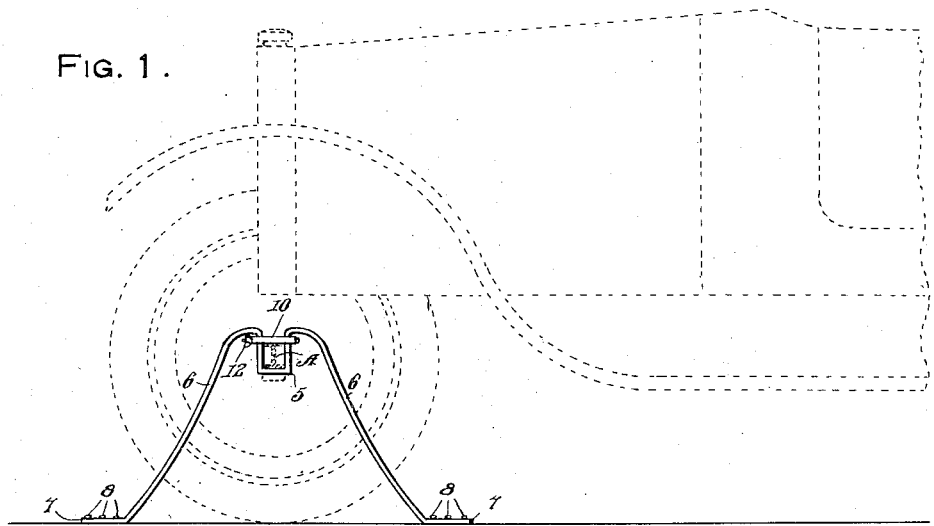
Figure 2:
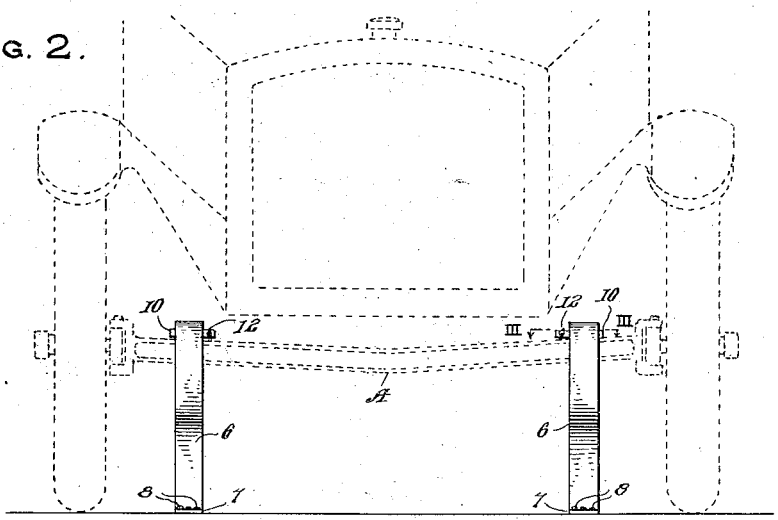
Figure 3:
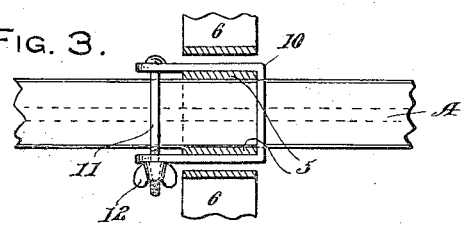
Figure 4:
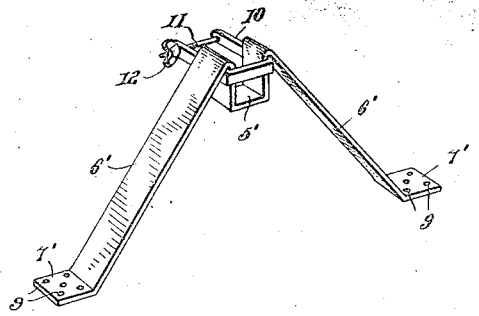

In the drawing wherein like reference characters indicate corresponding parts throughout the several views, Figure 1 is a side elevational view of the forward portion of an automobile and a loading buck constructed in accordance with the present invention operatively associated with the front axle of the automobile, Figure 2 is a front elevational view of the device shown in Fig. 1, Figure 3 is a horizontal sectional view taken substantially upon line III—III of Fig. 2, and shown on an enlarged scale, and Figure 4 is a perspective view of a modification of the buck shown in Fig. 1.

In the shipment of automobiles, it is the usual practice to secure the automobiles upon the floor of a freight car by the use of multi-part rigid bucks or by means of chock blocks and tie wires or ropes. The use of either of these, at best, involves the expenditure of a great waste of time and material and consequently is quite expensive. In the case of the multi-part bucks, which are usually made of wood, the bucks are practically always of necessity destroyed when the automobiles are unloaded.

The present invention, which comprises a yieldable and preferably one piece buck, is so designed and constructed as to be reused indefinitely and easily whereby the necessary expense in shipment of automobiles is reduced to a minimum. The present invention preferably embodies a substantially U-shaped member or stirrup 5 and downwardly diverging legs 6 having securing feet 7 at their lower ends adapted for having nails 8 or the like driven therethrough into the car floor for securing the buck in operative position. These several parts or members are preferably formed integral by shaping a single strip of sheet or other, preferably of a springy nature, so that the axle receiving stirrup 5 is yieldably or resiliently suspended by the diverging supporting legs 6 thereof. In loading automobiles on freight cars, two of the present bucks are preferably associated with the front axle A of the automobile, the stirrup 5 of each buck being adapted for reception of one end portion of the axle A. The present buck may also be used in the same manner on the rear axle of an automobile or on both the front and rear axles thereof if circumstance should so require. In order to insure resiliency of the legs 6, the same may be made of curved form as shown in Fig. 1, but if the same are formed from highly yieldable material, the device may be formed with the legs thereof straight as is the case with the legs 6' of the device shown in Fig. 4. In this form of the device, the legs 6' have the axle receiving stirrup 5' similar to the stirrup 5 of Fig. 1 and the legs 6' are flanged or provided with feet 7' at their lower ends which are apertured as at 9 for reception of nails or the like in securing the buck to the car floor.

The legs 6 or 6' are preferably of sufficient length to cause the axle A to seat in the stirrup 5 or 5' before the tires of the automobile supporting wheels engage the car floor, the weight of the automobile causing the legs 6 or 6' to bend or yield slightly for permitting the tires to engage the car floor so that a slight amount of the weight of the automobile is supported by the buck and the remaining weight is taken by the tires of the automobile supporting wheels. In this way the automobile is partially yieldably suspended in a vertical plane, and it will be apparent that upon the occurrence of strains and stresses, the legs 6 or 6' will yield forwardly or backwardly sufficiently to prevent the shearing of spring bolts or clips and the bending of reach rods which has been experienced from the use of rigid bucks.

My invention is primarily an axle chocking instead of suspension device, the longitudinal yielding features predominating over the vertical resiliency of the device while in use, the latter being mainly calculated as incidental to the mounting or assembling operation.

If desired, a U-clamp or clevis 10 having a transverse bolt 11 provided with a thumb nut 12 may be disposed to embrace the stirrup 5 or 5' above the axle A so as to effectively hold the automobile from material upward displacement from the car floor, the U-clamp 10 being disposed beneath the upper ends of the legs 6 or 6' and consequently insuring the holding of the automobile down on the car floor.

It will be apparent that my form of buck or chock may be cheaply and easily made in one piece and is returnable. The heads of the nails 8 can be easily chipped off with a cold chisel, and the device then pulled up from the floor and sent back to the shipper of the automobiles. Thus, use of my device enables one to obtain a maximum output from minimum equipment, the device being durable and efficient.

A resilient one piece buck or chock is provided affording a two-point suspension for an axle or hub member by reason of its two-legged formation, a single device being employed when found serviceable.

The construction and manner of use as well as the advantages of my invention will be readily understood and appreciated from the foregoing description by those skilled in the art and minor changes may be made therein without departing from the spirit and scope of the invention as claimed.

What is claimed as new is:

1. An automobile floor loading buck comprising means for the reception of a vehicle axle, and resilient or yieldable legs for said means adapted to be secured to a supporting surface and being of sufficient length to cause the said means to receive the weight of the automobile prior to the engagement of the wheels thereof with said surface when said legs yield.

2. A floor loading buck for holding an automobile against undue forward or backward movements when being shipped in a freight car comprising a pair of upwardly converging legs having a stirrup at the upper ends of the same adapted to receive an axle of the automobile and adapted to have their lower ends secured to the floor of the freight car, said legs being yieldable to permit limited forward or backward shifting of the automobile.

3. A floor loading buck for holding an automobile against undue forward or backward movements when being shipped in a freight car including a stirrup adapted to receive an axle of the automobile, and means to support said stirrup from the floor of the freight car in a position to engage said axle, said supporting means being adapted to be secured to said floor and being of yieldable material to permit limited forward or backward shifting of the automobile.

In testimony whereof I affix my signature.

EDWARD S. EVANS.